United States Patent
Liu et al.

(10) Patent No.: US 8,351,997 B2
(45) Date of Patent: Jan. 8, 2013

(54) SCHEDULING FOR POWER SAVINGS IN A WIRELESS NETWORK

(75) Inventors: Changwen Liu, Portland, OR (US); Adrian P. Stephens, Cambridge (GB); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/117,476

(22) Filed: May 27, 2011

(65) Prior Publication Data

US 2011/0268002 A1    Nov. 3, 2011

Related U.S. Application Data

(62) Division of application No. 11/726,818, filed on Mar. 22, 2007, now abandoned.

(51) Int. Cl.
*H04M 1/00* (2006.01)
*H04B 1/38* (2006.01)

(52) U.S. Cl. ..................... 455/574; 455/127.5

(58) Field of Classification Search .................. 455/574, 455/127.5, 343.1, 343.4, 500; 375/311, 338
See application file for complete search history.

(56) References Cited

U.S. PATENT DOCUMENTS

| | | | | |
|---|---|---|---|---|
| 6,067,297 | A * | 5/2000 | Beach | 370/389 |
| 7,697,457 | B2 * | 4/2010 | Igarashi et al. | 370/254 |
| 8,059,596 | B2 * | 11/2011 | Abedi | 370/329 |
| 2005/0043027 | A1 | 2/2005 | Emeott et al. | |
| 2005/0249227 | A1 * | 11/2005 | Wang et al. | 370/412 |
| 2006/0285526 | A1 * | 12/2006 | Jang et al. | 370/338 |
| 2007/0037548 | A1 | 2/2007 | Sammour et al. | |
| 2007/0047502 | A1 * | 3/2007 | Marinier et al. | 370/335 |
| 2007/0281641 | A1 | 12/2007 | Kim et al. | |
| 2008/0056290 | A1 * | 3/2008 | Hegde et al. | 370/412 |
| 2008/0095091 | A1 * | 4/2008 | Surineni et al. | 370/311 |
| 2010/0265907 | A1 * | 10/2010 | Meier | 370/329 |
| 2011/0075644 | A1 * | 3/2011 | Feder et al. | 370/338 |

* cited by examiner

*Primary Examiner* — Nguyen Vo

(74) *Attorney, Agent, or Firm* — Schwabe, Williamson & Wyatt, P.C.

(57) ABSTRACT

In a wireless network, a wireless device may dynamically estimate how long it can remain in a sleep mode without missing out on necessary opportunities to communicate within the network. In some embodiments, this estimate may be based at least partly on an estimate of how long it will take to transmit data in a transmit queue.

7 Claims, 3 Drawing Sheets

SCHEDULING FOR POWER SAVINGS IN A WIRELESS NETWORK

This application is a divisional of U.S. patent application Ser. No. 11/726,818, filed Mar. 22, 2007 now abandoned, and claims priority to that filing date.

BACKGROUND

Mobile wireless devices in wireless networks usually depend on a battery for their operating power. To extend the time that the devices are capable of operating between battery charges, the devices may resort to sleep periods (i.e., periods of non-operation, at least for the radio circuits, when the battery drain is greatly reduced). During a sleep period the data to be communicated to/from the device may be queued up until the device is operational again. Knowing how long to sleep (without obsoleting and/or missing necessary data) may be problematic even in fairly simple systems. However, the complexity of modern network communications and the mixture of different data types in a network (e.g., text, video, voice-over-IP, etc.), makes it difficult to determine a balance between saving more power (which may be achieved with longer sleep periods) and not obsoleting and/or missing necessary data (which may be achieved with shorter sleep periods).

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
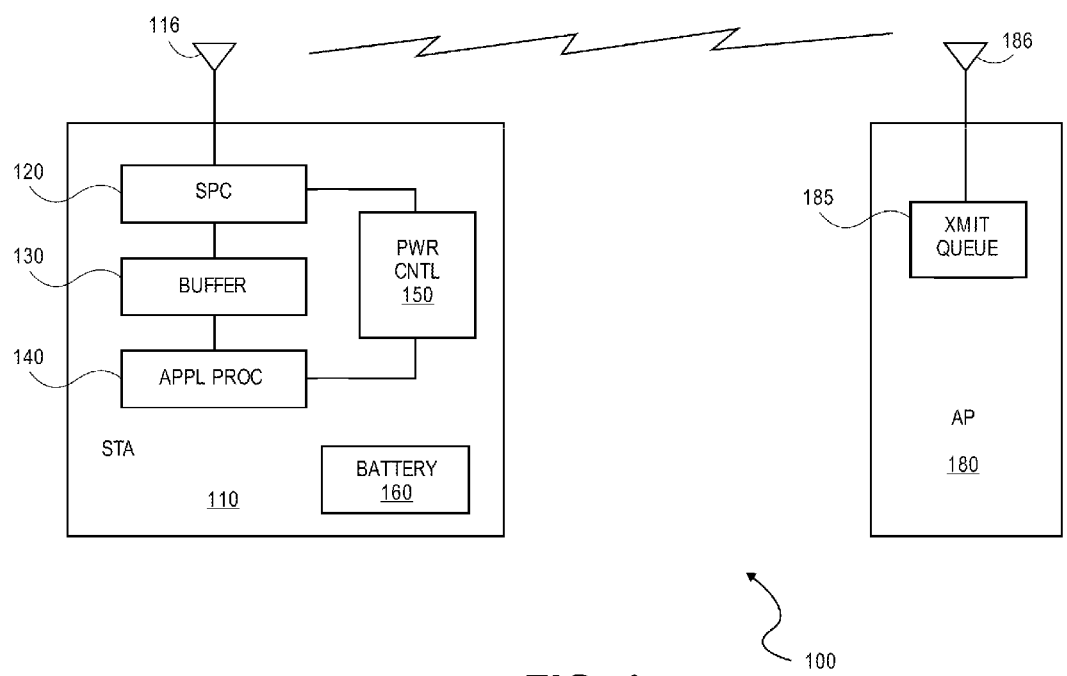
FIG. 1 shows two devices in a wireless network according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that can be in motion while it is communicating.

Some embodiments of the invention may dynamically adjust a sleep interval for a mobile wireless communications device (subsequently called a STA in this document), based on various operational factors such as the actual or estimated amount of data to be communicated. In some operations the goal of this adjustment is to make the sleep interval as long as is feasible without a significant chance of losing or obsoleting data in the communications exchange because the STA was asleep. 'Asleep', 'sleep mode', and related variations of the term 'sleep' refer to a mode in which the signal processing circuitry of the STA goes into a non-operational low power mode to reduce overall power consumption. In some embodiments other portions of the STA may remain in an operating mode during the sleep mode, but other embodiments may use other techniques. The techniques described herein may be especially beneficial when used in conjunction with a network protocol commonly known as Unscheduled Advanced Power Saving Delivery (U-APSD).

In some embodiments the STA may determine its sleep interval based on estimated downlink transmissions to be received from an access point or other centralized network control node. In other embodiments the STA may determine its sleep interval based on estimated uplink transmissions to be transmitted from the STA to the centralized network control node. In still other embodiments the STA may determine its sleep interval based on a combination of uplink and downlink considerations.

FIG. 1 shows two devices in a wireless network according to an embodiment of the invention. In the illustrated network 100, a mobile wireless device 110 (STA) may communicate wirelessly with centralized network controller 180 (AP) through their respective antennas 116 and 186. The STA may be any of multiple types of wireless devices, such as but not limited to a wireless personal computer (PC), a personal data assistant (PDA), etc. The STA is shown with a signal processing circuit (SPC) 120 that may convert digital data into signals suitable for radio frequency (RF) transmission, and may also convert received RF signals into digital data suitable for processing by digital circuitry. In some embodiments the SPC 120 may include such things as RF circuitry, baseband circuitry, and a digital signal processor (DSP), although other embodiments may include other combinations. A buffer 130 may hold data for subsequent conversion/transmission by the SPC 120, and/or may hold data that has been received and converted through the SPC 120 for subsequent processing by application processor 140. In some embodiments the buffer 130 may comprise a transmit queue and/or a receive queue.

STA 110 may also include a battery 160 to provide operating power to various parts of the STA. In the illustrated embodiment, power control circuit 150 may control whether SPC 120 is in a low-power sleep mode, a full-power operating mode, or some other intermediate power mode, based on control signals from the application processor that may be based at least in part on the data communicated between the STA and AP. Other parts of the STA may also have various modes of power consumption and operating status, which may be controlled by the power control circuit 150 and/or one or more other power control circuits (not shown).

The AP is shown with a transmit queue 185, in which it may place data to be transmitted to the STA and/or other STAs. Both the STA 110 and the AP 180 may have other circuits, which have not been shown because they are not considered key to an understanding of the various embodiments of the invention.

Figure 2:
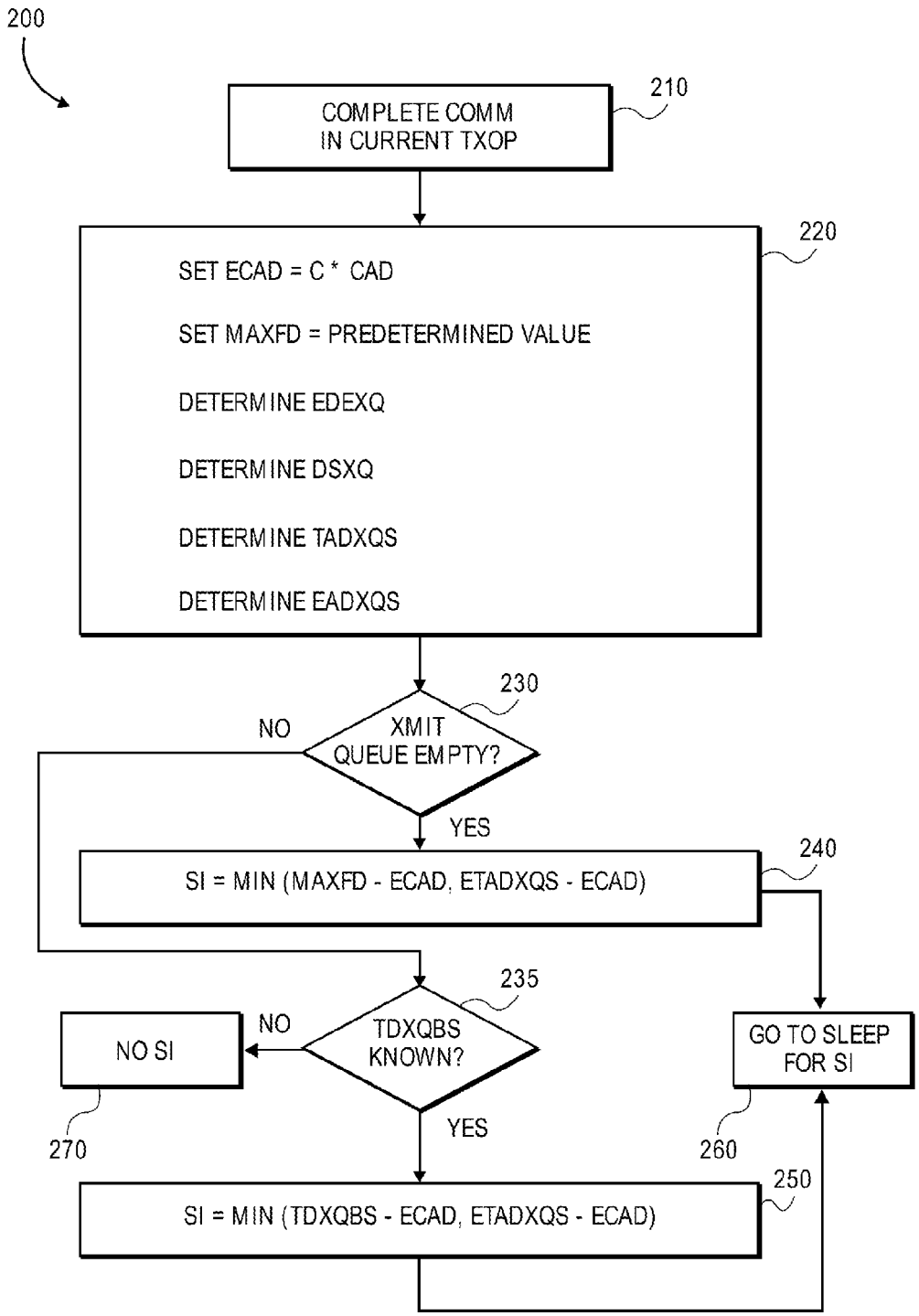
FIG. 2 shows a flow diagram of a method of dynamically determining a sleep interval based on downlink communications, according to an embodiment of the invention.

FIG. 2 shows a flow diagram of a method of dynamically determining a sleep interval for a wireless communications device based on downlink communications, according to an embodiment of the invention. For convenience and improved understanding, the following acronyms and meanings are used in the discussion of FIG. 2, but the embodiments of the invention should not be limited to devices using these acronyms. Note: although these parameters may be used in the STA to determine a sleep interval for the STA, the transmit queue referred to in these definitions is the AP's transmit queue. The relevant information about the AP transmit queue may be communicated to the STA through any feasible means.

- SI—Sleep Interval. The duration of time during which the SPC is in a non-operational low power mode. Separate sleep intervals may have different durations. In some embodiments other circuits may also be in a low-power mode during the sleep interval.
- MAXFD—Maximum Flow Delay. This is the maximum time allowed for a communications flow. In some embodiments this number will be specified in a Traffic Specification (TSPEC) provided by the AP for the STA. For operations in which the AP does not provide a value for MAXFD, a reasonable value may be determined by the STA (e.g., 200 milliseconds for a particular usage).
- CAD—Channel Access Delay, based on historic efforts to gain channel access. Channel access delay is the time it takes the STA to gain access to the channel, once the STA starts trying to gain access to the channel. CAD may include such variable delays as waiting for a clear channel, contending for access to the medium, retrying the access if the access fails, etc. The current value of CAD may be based on the most recent access, or may be based on a mathematical treatment of multiple recent accesses (e.g., an average of the five most recent access delays).
- ECAD—Estimated Channel Access Delay. This is an artificially increased version of the value of CAD. In some operations ECAD may be determined by multiplying CAD by a constant (e.g., a constant 'C') that is greater than 1. In other embodiments ECAD may be set as a fraction of MAXFD. The STA must acquire access to the channel before it can begin performing the next data exchange, but this acquisition time may be highly variable. ECAD provides a time 'cushion', so that most accesses will take place within the ECAD time period. In some embodiments the value of ECAD may be adjusted periodically, based on parameters such as what fraction of accesses actually take longer than the ECAD time period.
- EDEXQ—Estimated Delay to Empty Transmit Queue. When the AP still has data to transmit at the end of the previous transmit opportunity (TXOP), an estimate may be made of the time it will take the AP to clear that data out of the transmit queue by actually transmitting it.
- DSXQ—Desired Size of Transmit Queue. To make efficient use of the burst nature of communicating over a shared channel, larger bursts of data may be more efficient for the overall network, and provide higher network throughput, than smaller bursts. However, excessively large bursts may cause other throughput problems, such as loss of time-critical data by other devices. Based on these and other factors, a desired size of burst may be determined, and an amount of data in the transmit queue that is equivalent to this burst size is defined as DSXQ.
- ETADXQS—Estimated Time to Accumulate Desired Transmit Queue Size. This is the estimated time it will take for the AP to accumulate enough data in the transmit queue to equal the DSXQ value. In some embodiments, ETADXQS may=(DSXQ−the current queue size) divided by the rate of arrival of the data, and the rate of arrival of the data may=(the amount of data transmitted+ (queue size at end−queue size at the start)), divided by the time interval, but other embodiments may use other techniques to calculate ETADXQS.
- TDXQBS—Time till Data in Transmit Queue Becomes Stale. In some operations, time-critical data (e.g., streaming video data) in the transmit queue has an expiration time. If the data is not transmitted by that expiration time, the data becomes useless for its intended purpose (i.e., becomes 'stale'), and may be discarded by either the transmitting device before it can be transmitted, or by the receiving device after reception. TDXQBS is the time remaining until that expiration time. This is a dynamic number that varies depending on the time-critical data in the transmit queue. If there are multiple expiration times in the transmit queue, the shortest time may be used. In some operations the AP communicates this value to the STA, and the STA may then use this value in some of its calculations. In other types of operations this value is unknown to the STA, and therefore cannot be used by the STA in its calculations. In this latter case, the STA may immediately access the channel without going to sleep (for example, by treating TDXQBS as 0). If the transmit queue is empty, TDXQBS may be equal to MAXFD.

Referring again to FIG. 2, flow diagram 200 shows operations that may be performed in a STA. At 210, the STA may complete its current communications sequence with another wireless device, and prepare for entering a sleep mode in which its SPC will be placed in a low power non-operational state. In some embodiments that communications sequence may be defined as a TXOP, but other embodiments may use other techniques. To determine how long the STA will be in the sleep mode, it determines a number of parameters at 220. As stated in the acronym definitions above, MAXFD may be predetermined, while ECAD may be produced by multiplying CAD by a constant that is greater than 1. EDEXQ, DSXQ, TADXQS, and EADXQS may be determined by examining various operational factors, such as but not limited to transmission data rate, variability of transmission data rate, variability of CAD, network capacity, recent network throughput, operational parameters specified by the AP, etc. Once all the necessary factors have been determined through monitoring, calculation, etc., the critical parameters that determine the sleep interval may be derived.

At 230, it's determined whether the transmit queue 185 is empty and at 235 it's determined whether TDXQBS is known to the STA. Three cases may be considered:

1. If the transmit queue is empty, then the sleep interval SI may be determined at 240 as 1) MAXFD−ECAD, or 2) ETADXQS−ECAD, whichever is smaller.

2. If the transmit queue is not empty and TDXQBS is known to the STA, then the sleep interval SI may be determined at 250 as 1) TDXQBS−ECAD, or 2) ETADXQS−ECAD, whichever is smallest.

3. If the transmit queue is not empty and TDXQBS is not known to the STA, then the STA may immediately access the channel and try to download the data without going to sleep. SI is essentially zero with this option.

For the first two cases, the STA may enter the sleep mode at 260 and remain in sleep mode for the duration of the calculated SI, unless the sleep mode is interrupted by some external event not covered in this discussion. For the third case, there essentially is no non-zero sleep interval, as shown at 270.

After the STA wakes up at the end of the SI, it may establish communications with the AP, complete those communications, and repeat the operations of FIG. 2 to determine the duration of the next sleep interval.

Although the previous description assumes the STA completes a communications sequence (e.g., a TXOP) before determining the next value for SI, some embodiments may perform all or part of these calculations before the end of that communications sequence. However, performing these calculations while data is still being exchanged during the TXOP may produce less dependable results, since some of the parameters might not be based on complete information and/or the most recent information.

Figure 3:
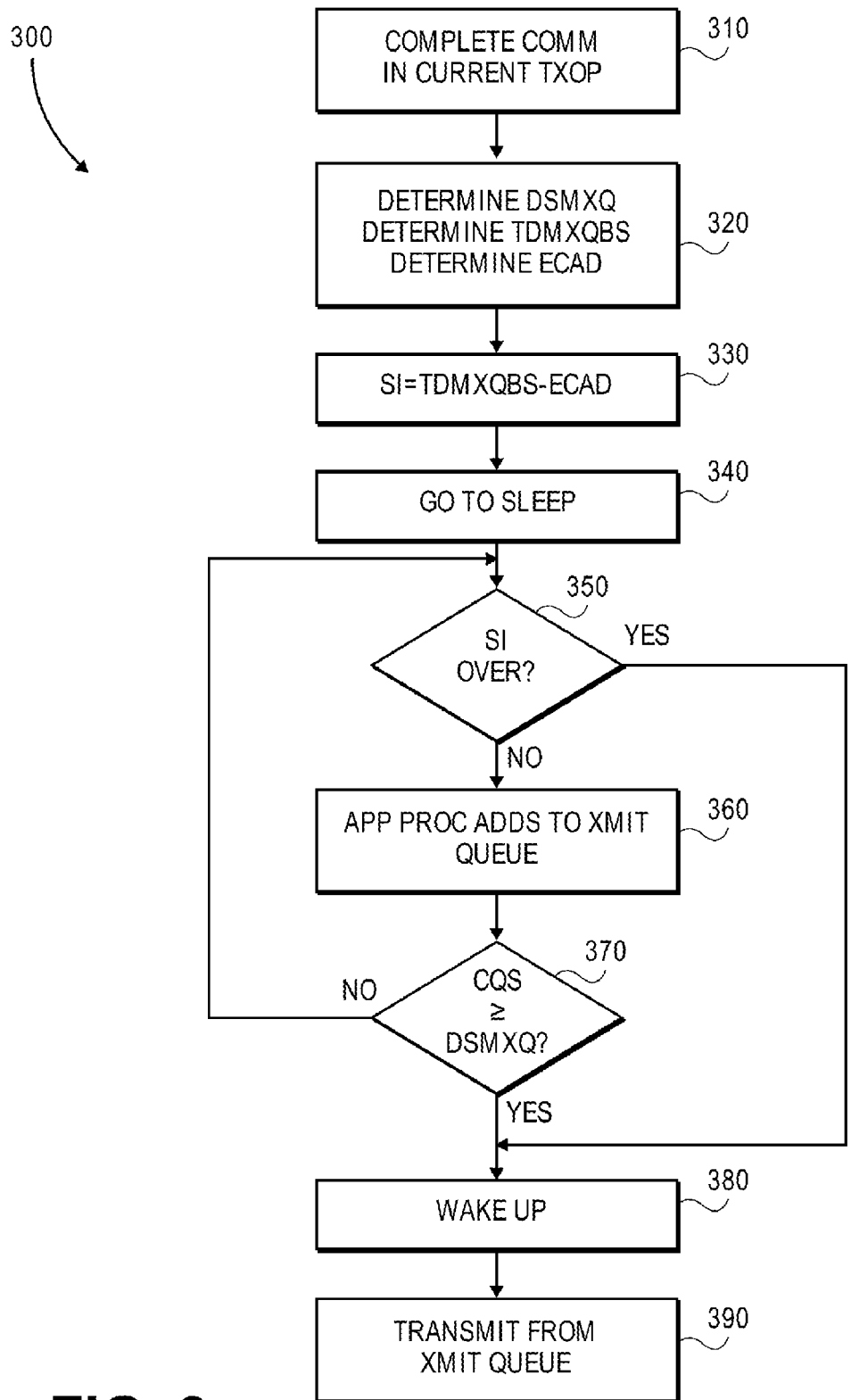
FIG. 3 shows a flow diagram of a method of dynamically determining a sleep interval based on uplink communications, according to an embodiment of the invention.

FIG. 3 shows a flow diagram of a method of dynamically determining a sleep interval for a wireless communications device based on uplink communications, according to an embodiment of the invention. For convenience and improved understanding, the following acronyms and meanings are used in the discussion of FIG. 3, but the embodiments of the invention should not be limited to devices using these acronyms. Note: although the definitions for FIG. 2 referred to the transmit queue in the AP, the definitions for FIG. 3 refer to the transmit queue in the STA.

CAD and ECAD—Same definitions that were used for these terms for FIG. 2, except that when deriving ECAD in this instance, CAD may be multiplied by a different constant than was used in the description for FIG. 2.

DSMXQ—Desired Size of My Transmit Queue. As previously described for DSXQ, data in the transmit queue may be allowed to build up until it reaches a preferred size for transmission. Since this transmit queue is in the STA rather than the AP, a different acronym is used to distinguish between the two transmit queues.

CQS—Current Queue Size. This reflects the amount of data currently in the transmit queue of the STA.

TDMXQBS—Time till Data in My Transmit Queue Become Stale. Similar to the previously described TDXQBS for FIG. 2, but the 'M' in the name refers to 'my' transmit queue, i.e., the transmit queue in the STA. This is a dynamic number that varies depending on the particular time-critical data in the current transmit queue. If there is no time-critical data in the queue, any sleep interval based on TDMXQBS may be eliminated or ignored.

Flow diagram 300 shows operations that may be performed in a STA. At 310, the STA may complete its current communications sequence with another wireless device, and prepare for entering a sleep mode in which its SPC may be in a non-operational low power state. In some embodiments this communications sequence may be a TXOP, but other embodiments may use other techniques. At 320, values for DSMXQ, TDMXQBS, and ECAD may be determined. At 330 the sleep interval is set to equal TDMXQBS minus ECAD, and the STA may enter the sleep mode at 340. If there is no time-critical data in the transmit queue, so that TDMXQBS cannot be calculated a reasonable sleep interval may be used instead.

Although the SPC portion of the STA may be in a non-operational state during the sleep mode, an applications processor or other processor in the STA may continue to operate. Among other things, this processor may continue placing data into the transmit queue at 360, the data in the transmit queue to be transmitted at a later time. This may continue until either 1) the sleep interval expires, as determined at 350, or 2) the sleep interval is prematurely terminated at 370 because the amount of data CQS in the transmit queue reaches or exceeds the desired queue size DSMXQ. In either case, after the STA wakes up at 380, it may acquire the channel and then transmit from the transmit queue at 390.

The previous paragraphs have described determining one sleep interval based on downlink communications, and another separate sleep interval based on uplink communications. But in some embodiments these may be combined, and a single sleep interval determined by considering both uplink and downlink traffic. For example, after determining these two sleep intervals independently, the sleep interval actually used may be the shortest of the two.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus comprising
   a first communications device comprising:
      a processor;
      a signal processing circuit coupled to the processor to communicate wirelessly with a second communications device;
      a power control circuit coupled to the processor and the signal processing circuit;
   wherein the power control circuit is configured to place the signal processing circuit into a non-operational mode for a sleep interval;
   wherein the first communications device is configured to communicate wirelessly with a second communications device in a wireless network; and
      determine an amount of data in a transmit queue after a previous communications sequence; and
   wherein the sleep interval is based at least partly on the determined amount of data in the transmit queue; and
   wherein the transmit queue is of the second communications device and it is determined there is no data in the transmit queue, the first communications device being further configured to determine the sleep interval as (MAXFD−ECAD) or (ETADXQS−ECAD), whichever is smaller, where MAXFD is a maximum flow delay, ECAD is an estimated channel access delay, and ETADXQS is an estimated time to accumulate desired transmit queue size.

2. The apparatus of claim 1, wherein a new sleep interval is to be determined for each of multiple transmit opportunities.

3. An apparatus comprising:
a first communications device comprising:
  a processor;
  a signal processing circuit coupled to the processor to communicate wirelessly with a second communications device;
  a power control circuit coupled to the processor and the signal processing circuit;
  wherein the power control circuit is configured to place the signal processing circuit into a non-operational mode for a sleep interval;
  wherein the first communications device is configured to communicate wirelessly with a second communications device in a wireless network; and
    determine an amount of data in a transmit queue after a previous communications sequence; and
  wherein the sleep interval is based at least partly on the determined amount of data in the transmit queue; and
  wherein the transmit queue is of the second communications device and it is determined there is data in the transmit queue, the first communications device being further configured to determine the sleep interval as (TDXQBS−ECAD) or (ETADXQS−ECAD), whichever is smaller, where TDXQBS is a time until data in the transmit queue becomes stale, ECAD is an estimated channel access delay, and ETADXQS is an estimated time to accumulate desired transmit queue size.

4. An apparatus comprising:
a first communications device comprising:
  a processor;
  a signal processing circuit coupled to the processor to communicate wirelessly with a second communications device;
  a power control circuit coupled to the processor and the signal processing circuit;
  wherein the power control circuit is configured to place the signal processing circuit into a non-operational mode for a sleep interval;
  wherein the first communications device is configured to communicate wirelessly with a second communications device in a wireless network; and
    determine an amount of data in a transmit queue after a previous communications sequence; and
  wherein the sleep interval is based at least partly on the determined amount of data in the transmit queue; and
  wherein the transmit queue is of the first communications device, the first communications device being further configured to determine the sleep interval as (TDMXQBS−ECAD), where TDMXQBS is a time until data in the transmit queue becomes stale and ECAD is an estimated channel access delay.

5. The apparatus of claim 4, wherein the sleep interval is to be ended when the amount of data in the transmit queue reaches a particular level.

6. An apparatus, comprising: a first communications device comprising:
  a processor;
  a signal processing circuit coupled to the processor to communicate wirelessly with a second communications device;
  a power control circuit coupled to the processor and the signal processing circuit;
  wherein the power control circuit is configured to place the signal processing circuit into a non-operational mode for a sleep interval;
  wherein the first communications device is configured to communicate wirelessly with a second communications device in a wireless network; and
    determine an amount of data in a transmit queue after a previous communications sequence; and
  wherein the sleep interval is based at least partly on the determined amount of data in the transmit queue; and
  wherein the power control circuit is further configured to wake up the signal processing circuit prior to expiration of the sleep interval based at least partly on determination that $CQS \geqq DSMXQ$, where CQS is current queue size and DSMXQ is desired size of the transmit queue.

7. The apparatus of claim 6, wherein the first communications device is configured to:
  determine a change in an amount of data in the transmit queue; and
  determine the sleep interval based at least partly on the change in the amount of data of the transmit queue.

* * * * *